US008654843B2

(12) United States Patent
Onno et al.

(10) Patent No.: US 8,654,843 B2
(45) Date of Patent: Feb. 18, 2014

(54) METHOD AND DEVICE FOR CODING IMAGES REPRESENTING VIEWS OF THE SAME SCENE

(75) Inventors: Patrice Onno, Rennes (FR); Xavier Henocq, Melesse (FR); Fabrice Le Leannec, Mouaze (FR)

(73) Assignee: Canon Research Centre France, Cesson-Sevigne (FR)

( * ) Notice: Subject to any disclaimer, the term of this patent is extended or adjusted under 35 U.S.C. 154(b) by 1533 days.

(21) Appl. No.: 11/871,640

(22) Filed: Oct. 12, 2007

(65) Prior Publication Data

US 2008/0095231 A1     Apr. 24, 2008

(30) Foreign Application Priority Data

Oct. 18, 2006   (FR) ...................................... 06 54347

(51) Int. Cl.
*H04N 7/12* (2006.01)
*H04N 11/02* (2006.01)
*H04N 11/04* (2006.01)

(52) U.S. Cl.
USPC ..................................................... 375/240.12

(58) Field of Classification Search
None
See application file for complete search history.

(56) References Cited

U.S. PATENT DOCUMENTS

| 6,501,860 | B1 | 12/2002 | Charrier et al. .............. 382/240 |
|---|---|---|---|
| 6,891,895 | B1 | 5/2005 | Onno et al. .................... 375/260 |
| 7,113,643 | B2 | 9/2006 | Le Leannec et al. ......... 382/235 |
| 7,190,838 | B2 | 3/2007 | Le Leannec et al. ......... 382/233 |
| 7,212,678 | B2 | 5/2007 | Brown et al. ................. 382/240 |
| 7,215,819 | B2 | 5/2007 | Onno et al. ................... 382/240 |
| 7,260,264 | B2 | 8/2007 | Guillou et al. ................ 382/232 |
| 7,281,033 | B2 | 10/2007 | Le Leannec et al. ......... 709/217 |
| 2002/0048319 | A1 | 4/2002 | Onno ............................ 375/240 |
| 2002/0171668 | A1* | 11/2002 | Samra .......................... 345/619 |
| 2004/0006644 | A1 | 1/2004 | Henocq et al. ............... 709/246 |
| 2004/0012820 | A1 | 1/2004 | Donescu et al. ............. 358/3.28 |
| 2004/0042486 | A1 | 3/2004 | Onno et al. ................... 370/466 |
| 2004/0068587 | A1 | 4/2004 | Le Leannec et al. ......... 709/247 |
| 2004/0184529 | A1 | 9/2004 | Henocq et al. .......... 375/240.01 |
| 2005/0169543 | A1* | 8/2005 | Damera-Venkata .......... 382/236 |
| 2006/0146143 | A1* | 7/2006 | Xin et al. .................... 348/218.1 |
| 2006/0222079 | A1* | 10/2006 | Park et al. ................ 375/240.16 |

(Continued)

OTHER PUBLICATIONS

Yang, W., et al. "An MPEG-4-Compatible Stereoscopic/Multiview Video Coding Scheme", IEEE Transactions on Circuits and Systems for Video Technology, vol. 16, No. 2, pp. 286-290, Feb. 2006.

(Continued)

*Primary Examiner* — Jae Y Lee
(74) *Attorney, Agent, or Firm* — Fitzpatrick, Cella, Harper & Scinto

(57) ABSTRACT

The present invention concerns a method of coding a plurality of digital image signals in a bitstream, said signals each corresponding to a view of a scene, the said coding method comprising the use of a pre-determined predictive coding structure, the views being associated with input views in the coding structure. The coding method according to the invention comprises, for at least one pair of views of the scene, steps of determining a spatial intersection zone (E44) and of calculating a value representing the similarity between the signals corresponding to said views (E45), according to at least some of the signals contained in said spatial intersection zone. These steps are followed by a step of associating (E46) at least one view with an input view of the predictive coding structure according to at least one calculated similarity value. The invention applies both to fixed image signals and to image sequences.

19 Claims, 7 Drawing Sheets

(56) References Cited

U.S. PATENT DOCUMENTS

| | | | |
|---|---|---|---|
| 2007/0019721 A1 | 1/2007 | Le Leannec et al. | 375/240.1 |
| 2007/0127576 A1 | 6/2007 | Henocq et al. | 375/240.16 |
| 2007/0195880 A1 | 8/2007 | Henocq et al. | 375/240.13 |
| 2007/0216699 A1 | 9/2007 | Le Leannec et al. | 345/555 |
| 2007/0223033 A1 | 9/2007 | Onno et al. | 358/1.15 |
| 2007/0286508 A1 | 12/2007 | Le Leannec et al. | 382/240 |
| 2008/0025399 A1 | 1/2008 | Le Leannec et al. | 375/240.16 |
| 2008/0075170 A1 | 3/2008 | Henocq et al. | 375/240.16 |
| 2008/0130736 A1 | 6/2008 | Onno et al. | 375/240.01 |
| 2008/0131011 A1 | 6/2008 | Le Leannec et al. | 382/238 |
| 2008/0144725 A1 | 6/2008 | Henocq et al. | 375/240.27 |
| 2009/0279608 A1* | 11/2009 | Jeon et al. | 375/240.16 |

OTHER PUBLICATIONS

Tate, S.R. "Band Ordering in Losssless Compression of Multispectral Images", IEEE Transactions on Computers, vol. 46, No. 4, pp. 477-483, Apr. 1997.

Baochun Bai, et al. "An Efficient Multiview Video Compression Scheme", Proceedings of the IEEE International Conference on Multimedia and Expo, pp. 836-839, Jul. 6, 2005.

Sohn, K. et al. "Results on CE1 for Multi-View Video Coding", Joint Video Team (JVC) of ISO/IEC MPEG & ITU-T VCEG (ISO/IEC JTC1/SC29/WG11 and ITU-T SG16 Q.6), JVT-102, pp. 1-11, Jul. 2006.

* cited by examiner

Fig 6b

| Sequence | Sum |
|---|---|
| S1 | 3.25 |
| S2 | 3.31 |
| S3 | 3.89 |
| S4 | 3.60 |
| S5 | 3.17 |

Fig 7b

| MCV view | Sequence |
|---|---|
| V1 | S3 |
| V2 | S1 |
| V3 | S4 |
| V4 | S2 |
| V5 | S5 |

Fig 6a

| Sequence | S1 | S2 | S3 | S4 | S5 |
|---|---|---|---|---|---|
| S1 | 1 | 0.70 | 0.65 | 0.55 | 0.35 |
| S2 | 0.70 | 1 | 0.82 | 0.37 | 0.42 |
| S3 | 0.65 | 0.82 | 1 | 0.85 | 0.57 |
| S4 | 0.55 | 0.37 | 0.85 | 1 | 0.83 |
| S5 | 0.35 | 0.42 | 0.57 | 0.83 | 1 |

Fig 7a

| MCV view | Sequence |
|---|---|
| V1 | S4 |
| V2 | S5 |
| V3 | S3 |
| V4 | S1 |
| V5 | S2 |

METHOD AND DEVICE FOR CODING IMAGES REPRESENTING VIEWS OF THE SAME SCENE

This application claims the benefit of French Patent Application No 06/54347, filed on Oct. 18, 2006, which is herein incorporated by reference.

BACKGROUND OF THE INVENTION

1. Field of the Invention

The present invention concerns a method and device for coding images representing views of the same scene.

The invention is situated in the technical field of image coding, and in particular in the field of the coding of multiple views of the same scene.

2. Related Art

The future MVC (the acronym for Multi-View Coding) video coding standard developed by the JVT (Joint Video Team) group of ISO/IEC MPEG and ITU-T VCEG aims to define a format for coding video sequences coming in particular from several cameras in a single bitstream, the number and spatial positioning of these cameras being able to be variable. The sequences may also be synthetic video sequences that are stored prior to coding to the MVC format.

The video coding proposed in the context of MVC is based on the MPEG4-AVC format, also referred to as H.264, which has good performance in terms of video compression. The specificity of MVC compared with H.264 is the possibility of simultaneously coding several views of the same scene. In order to improve the efficacy of compression and to take account of potential redundancies between views, it has been proposed to code the images of sequences representing the views in a dependent manner, by defining in particular a so-called principal view that serves as a reference for the other views. These other views, referred to as secondary, are coded in a coding dependency structure with respect to the principal view. Subjective tests have shown the gain in this approach compared with a coding of views carried out independently.

Firstly, the principal view and the position of the secondary views in the coding dependency structure were chosen in an arbitrary manner, the principal view being for example the view of the first camera, the first secondary view corresponding to the view of the second camera and so on.

The JVT-102 technical contribution entitled "Results on CE1 for multi-view video coding", by Sohn et al, presented at the Klagenfurt meeting of 17-21 Jul. 2006, proposes a structure in which the sequence corresponding to the principal view is chosen according to a criterion of disparity between the sequences. The disparity is calculated between the adjacent sequences and the sequence chosen as the principal view is that having a disparity with the adjacent sequences corresponding to the median of the disparities calculated. The arrangement of the other sequences being coded according to the predictive (P) or bidirectional (B) coding mode is determined solely according to the distances between the photographic cameras with respect to the camera relating to the principal view. This method has the drawback of calculation complexity for the choice of the principal view. With regard to the choice of the secondary views, their arrangement does not make it possible to end up with an optimized coding in terms of compression.

SUMMARY OF THE INVENTION

The present invention aims to remedy at least one of the aforementioned drawbacks by proposing a method of coding a plurality of digital image signals in a bitstream, said signals each corresponding to a view of a scene, said coding method comprising the use of a pre-determined predictive coding structure, the views being associated with input views in the coding structure. The method according the invention comprises steps of:

for at least one pair of views of the scene, determining a spatial intersection zone, calculating a value representing the similarity between the signals corresponding to said views, according to at least some of the signals contained in said spatial intersection zone, and associating at least one view with an input view of the predictive coding structure according to at least one calculated similarity value.

Thus, by virtue of the invention, the initial views of a scene are associated with the input views of the predictive coding structure according to the similarity of the images or sequences of images representing the views. Advantageously, the similarity calculation is performed solely within a spatial zone common between two views, which alleviates the calculation complexity of the method and reduces the corresponding calculation time.

In a particular embodiment, the determination and calculation steps are performed for all the pairs of views of the scene. Moreover, in the step of associating at least one view with an input view of the predictive coding structure, said association is made according to all the values representing the calculated similarity.

Thus all the image signals corresponding to the various views are taken into account so as to obtain an appropriate arrangement at the input of the predictive coding structure, according to the similarity between all the image signals.

According to a variant of the invention, each image signal is obtained by a distinct photographic device, and at least one parameter of said photographic devices is used in the step of determining an intersection spatial zone.

Thus, when the image signals come from photographic devices, such as digital moving cameras, the invention proposes to take advantage of the availability of the parameters of these devices to simplify the determination of an intersection zone.

According to another variant of the invention, the step of determining a spatial intersection zone comprises a step of adjustment between at least two images of the signals corresponding to the views in question.

Thus the invention also provides a way of treating the cases where the parameters of any devices photographing the signals are not available.

In a particular embodiment, in the association step, a view is associated with an input view of the predictive coding structure according to the intercorrelation value of the image signal corresponding to said input view with an image signal corresponding to a view previously associated with another input view of the predictive coding structure.

By virtue of the invention, the association of the signals with the input views of the predictive coding structure is made according to the similarity between signals, which makes it possible to optimize the efficacy of the prediction in order to result in a better final compression ratio for a given quality or for a better quality at a fixed compression ratio.

The invention also provides a prior step of obtaining a method of selecting the first input view, referred to as the principal view, of the predictive coding structure.

According to a particular embodiment, the method of selecting the principal view is selection by a user.

Thus the selection of the principal view makes it possible to adapt to the requirements of the user, who can have a more rapid access to the view that he wishes to favor.

According to a variant, when the bitstream is accessible to a plurality of client entities each able to choose a principal view, the method of selecting the principal view is selection according to the majority choice of the client entities.

Thus, by virtue of the invention, the principal view can for example be selected as being the view most requested among a set of clients. This is particularly advantageous since the sequence corresponding to this view is easily accessible and rapidly decodable, which makes it possible to best satisfy the requirements of a majority of clients.

According to another variant, the method for selecting the principal view is selection according to a coding optimization criterion.

According to this variant, the principal view selected is the view corresponding to the image signal for which the sum of the values of similarity with all the other image signals is maximum.

By virtue of this variant of the invention, the coding efficacy is optimized globally for all the image signals to be coded.

According to one embodiment of the invention, the value representing the similarity between signals is the intercorrelation between signals contained in the intersection zone.

The intercorrelation is a simple and significant measurement of the similarity between image signals.

Still for the same purpose, the present invention also proposes a device for coding a plurality of digital image signals in a bitstream, said signals each corresponding to a view of a scene, said coding device being able to implement a coding method comprising the use of a predetermined predictive coding structure, the views being associated with input views in the coding structure, characterized in that it comprises:

for at least one pair of views of the scene, means of determining a spatial intersection zone means of calculating a value representing the similarity between the signals corresponding to said views, according to at least some of the signals contained in said spatial intersection zone, means of associating at least one view with an input view of the predictive coding structure according to at least one calculated similarity value.

The device for coding a plurality of digital image signals according to the invention comprises means of using the characteristics of the method of coding a plurality of digital image signals previously disclosed. This device has advantages similar to those of the coding method according to the invention.

An information storage means, possibly totally or partially removable, able to be read by a computer system, comprises instructions for a computer program adapted to implement the coding method according to the invention when this program is loaded into and executed by the computer system.

A computer program that can be read by a microprocessor comprises portions of software code adapted to implement the coding method according to the invention, when it is loaded into and executed by the microprocessor.

The information storage and computer program means have characteristics and advantages similar to the methods that they implement.

BRIEF DESCRIPTION OF THE DRAWINGS

Other particularities and advantages of the invention will also emerge from the following description, illustrated by the accompanying drawings, in which:

FIGS. 6a and 6b depict tables containing sequence intercorrelation values used for an example embodiment of the invention;

FIGS. 7a and 7b depict two examples of association of the sequences with views according to two coding methods according to the invention.

DETAILED DESCRIPTION OF THE PREFERRED EMBODIMENTS

In describing the invention reference will be made in particular to the MVC coding format, for which a standard is currently being drawn up. Nevertheless it should be understood that the application of the invention is not limited to the MVC format, the invention being able to apply to any coding format using a plurality of views of a scene taken by a plurality of cameras or generated synthetically and stored in a memory space, and in particular for coding video sequences in such a context. The invention could nevertheless also apply for coding a plurality of fixed images.

Figure 1:
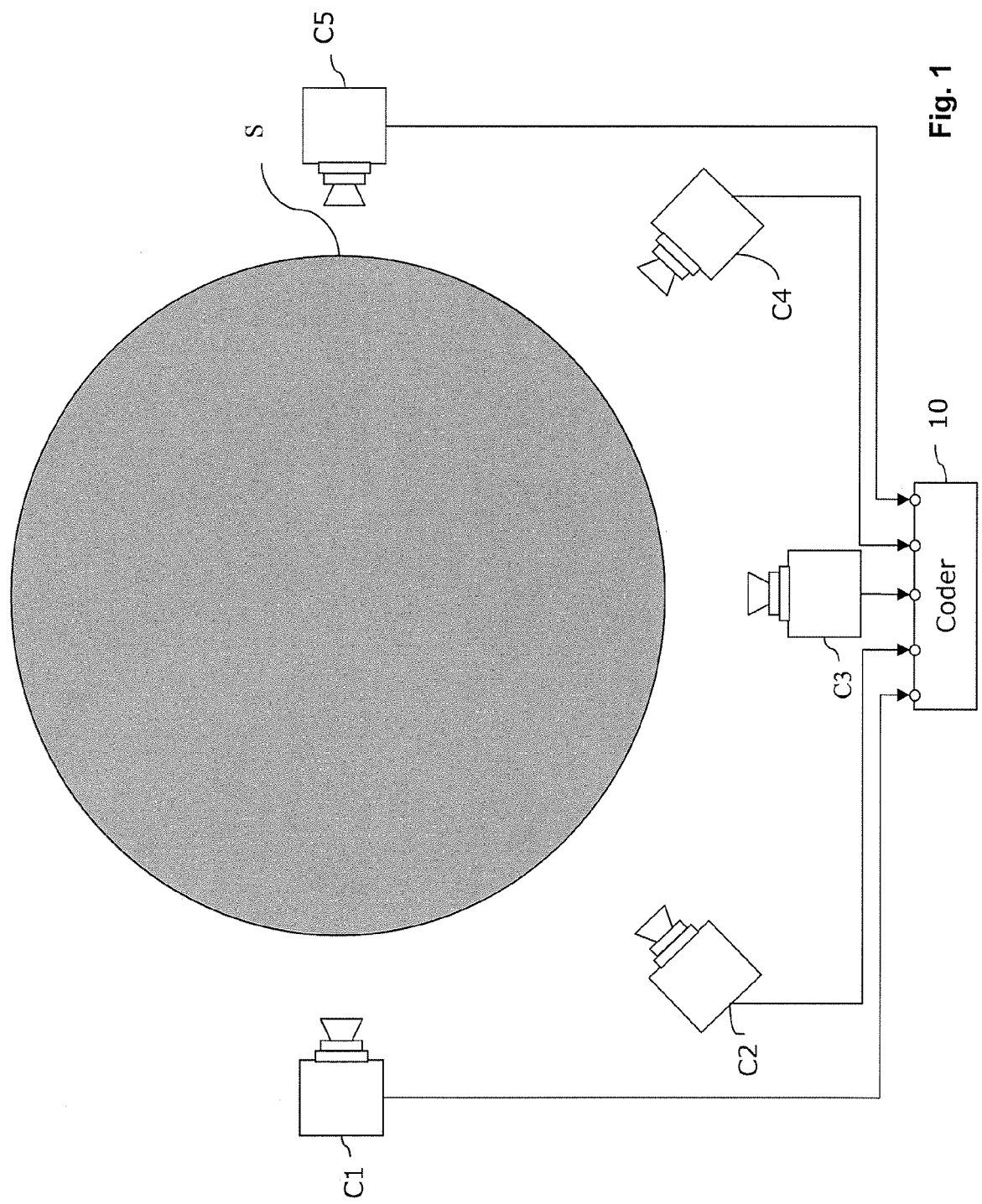
FIG. 1 depicts schematically a method of using a multi-view coder.

FIG. 1 illustrates a schematic example of a context of taking images of the multi-view type in which a multi-view coding finds its application. This figure shows five cameras C1 to C5 that are positioned in an arc of a circle around a scene, each supplying a different view of the scene S, represented by a gray-tinted circle in the figure. Each camera picks up a video stream that is sent to a coder 10, for example an MVC coder, which encodes all the video sequences of the views (five in number in this example) in a single bitstream not shown in the figure. The objective of such a coder is to take advantage of the correlations between the views in order to increase to the maximum possible extent the compression ratio of the resulting bitstream.

There can be any number of cameras and they can have any configuration. For example, cameras can be envisaged disposed at the four corners of a rectangle aimed at the center, or cameras disposed in several superimposed stages in front of a scene. The number of cameras is not limited and can be much greater than five. However, the greater this number, the greater the calculating power necessary for generating the final bitstream.

Figure 2:
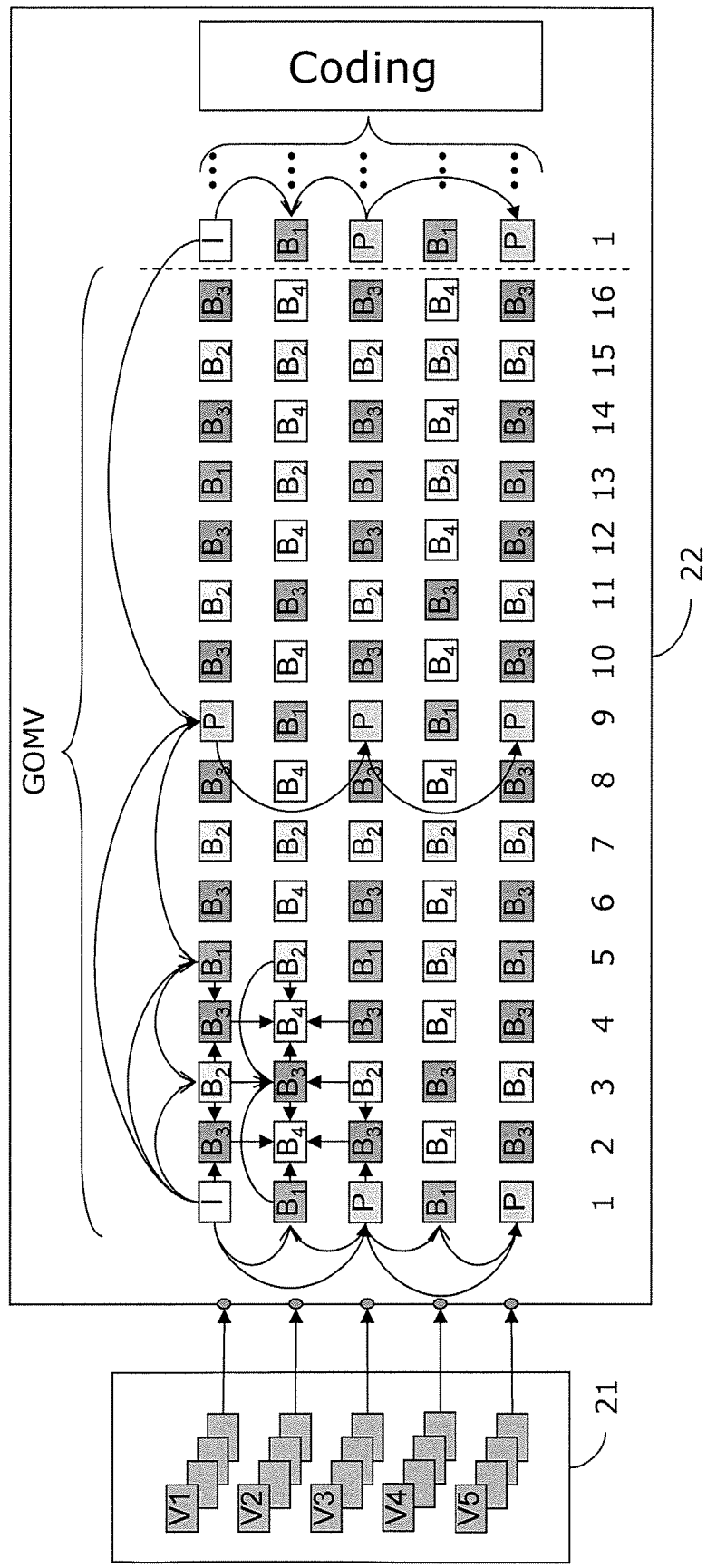
FIG. 2 depicts schematically a predictive coding structure for coding multiple views in the context of a multi-view coding.

FIG. 2 describes schematically a predictive coding structure used in MVC for the example of photographing illustrated previously in FIG. 1. In the example in FIG. 2, the views that the coder receives as an input are denoted V1 to V5. Without any prior preprocessing, these views can correspond respectively to the cameras C1 to C5. Alternatively, the sequences taken by the various cameras could have been stored in memory prior to the coding.

The MVC coder for which the standard is currently being drawn up is based on the H.264 coding techniques for the compression of views and uses spatio-temporal prediction both for the coding of the images of a given sequence coming from the same view (intra-view coding) and for the coding of the sequences corresponding to the views (inter-view coding). In an H.264 coder there exist principally three types of image:

so-called "intra" images, denoted I, are divided into macro-blocks that are coded independently, without making reference to other images.

so-called "predicted" images denoted P can use images from the past, the macro-blocks being predicted by means of motion vectors from macro-blocks of images encoded previously referred to as reference images. The macro-blocks are then coded either by temporal prediction (P), or in intra (I), in order to optimize the rate-distortion compromise.

so-called "bi-predicted" images denoted B can use past and future images for predicting macro-blocks. The macro-blocks are then coded either by bi-predicted temporal prediction (B), or by mono-predicted temporal prediction (P), or in intra (I), the choice being made so as to improve the rate-distortion compromise. The H.264 standard also makes it possible to predict a hierarchical prediction by creating several bi-predicted image levels.

As illustrated in FIG. 2, the images of a sequence coming from a given view, for example V1, are coded dependently according to the H.264 format: the first image of the first group of images of the sequence is coded in intra (I), the image in the $9^{th}$ position is a P image and the bi-predicted images are interposed between the I and P images. The images B1, B2 and B3 correspond to the H.264 hierarchical bi-predicted images: the images B1 are predicted from the P and I images, the images B2 are predicted from the P and I images B1 and the images B3 are predicted from the P and I images B2. This first view is processed in an identical manner to a sequence of images compressed using the H.264 standard.

In addition, in MVC coding, the sequences corresponding to the different views are also coded predictively, in a structure called a multi-view group (denoted GOMV, the acronym for "Group of Multi-Views" in English). In the example in FIG. 2, the group of multi-views contains the 16 images of the 5 different views. Thus a group of multi-view images can be coded independently, like a group of images ("group of pictures", denoted GOP) in the H.264 format.

With reference to FIG. 2, the arrows between the images of the various views illustrate the inter-view coding prediction structure according to the MVC format. For example, the first image of the view V3 is of the P type compared with the first image of V1, I. It can therefore comprise macro-blocks predicted by means of motion vectors from the I image of V1. In the same way, the first image of the group of images of the view V5 uses the first image of the view V3. For the views V2 and V4, the first images are bi-predicted from the first images of the other views.

With regard to the second view V2, this contains images denoted B3 that are bi-predicted from the images B2 of the views V1 and V3 with the same temporal index, and images denoted B4 that are predicted from four reference images coming from the view itself and the adjoining views, V1 and V3.

It appears clearly following the description of this predictive coding structure that there exists a certain hierarchy between the input views of the structure, and that the choice of the positioning of the sequences in the structure has major consequences in terms of efficacy of global compression of the coding. This is because the view placed first, V1, is the principal view, on which the inter-view predictions are based. In addition, it should also be noted that this view is more easily accessible at the time of decoding, since it is not coded in a dependent manner with respect to the other sequences, and will therefore be decoded first. Among the "secondary" views, there is also a hierarchy, since the views, the first image of which is coded in mono-predicted mode P (views V3 and V5 in the example), also serve as a basis of prediction for the other sequences. In this example, it is possible to classify the views in order of dependence in the following manner: V1, V3, V5 and [V2 V4]. This is because views V2 and V4 are both coded with respect to the previously coded views V1, V3 and V5 not serving as a basis for prediction in this example, and therefore their order of coding can be chosen arbitrarily.

Thus the positioning of the sequences in the multi-view predictive coding structure is very important since this determines both the efficacy of coding and the ease of subsequent access to the decoded sequences. The present invention proposes a solution to this problem, which has the advantage of having limited calculation complexity.

Figure 3:
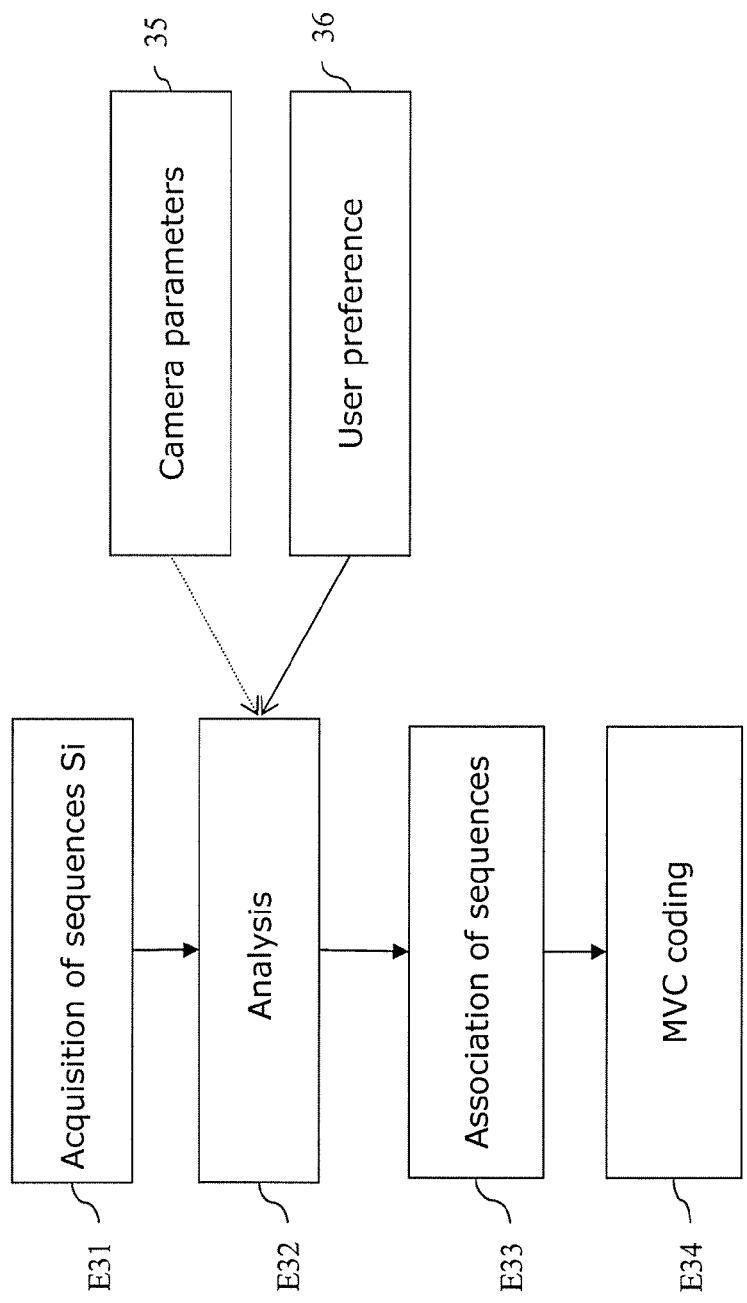
FIG. 3 depicts a block diagram of a multi-view coding method implementing the invention.

FIG. 3 illustrates the principal steps of a multi-view coding method implementing the present invention.

The first step E31 consists of the acquisition of the multi-view sequences Si corresponding to the various initial views of a scene, each view being able to be associated with a photographing camera. These sequences can be acquired directly coming from the cameras. Alternatively, the sequences can have been previously stored, for example on a hard disk, and step E31 consists in this case of obtaining them from the storage memory.

Step E31 is followed by a step of analyzing the content of the various sequences E32. This analysis can use in particular parameters of the photographic cameras corresponding to the sequences Si, and in particular the position of these cameras in space. The position of the cameras 35 is useful for determining the positioning of the sequences in the predictive coding structure, and in particular for determining the main view and successive secondary views. The preferences of the user 36 can also be taken into account optionally. An implementation of this step according to the invention will be detailed below in the description of FIG. 4.

The analysis step is followed by a step E33 of associating the initial views and their sequences Si associated with the input views of the predictive coding structure, according to the results of the analysis step.

For example, if five cameras are available in the example in FIG. 1, numbered C1 to C5, each taking a corresponding sequence S1 to S5, this step consists of associating each sequence with a view among the views of the predictive coding structure V1 to V5, which will then be coded according to the coding dependency structure illustrated in FIG. 2. Thus it would be possible to associate for example the sequence S3 with the principal view V1, S2 with V3 and S4 with V5 and finally S1 with V2 and S5 with V4.

Step E33 is followed by step E34 of multi-view coding of the sequences of images, a step that covers, according to the embodiment described here, the coding steps of the type H.264 known to persons skilled in the art, which will not be detailed here.

Figure 4:
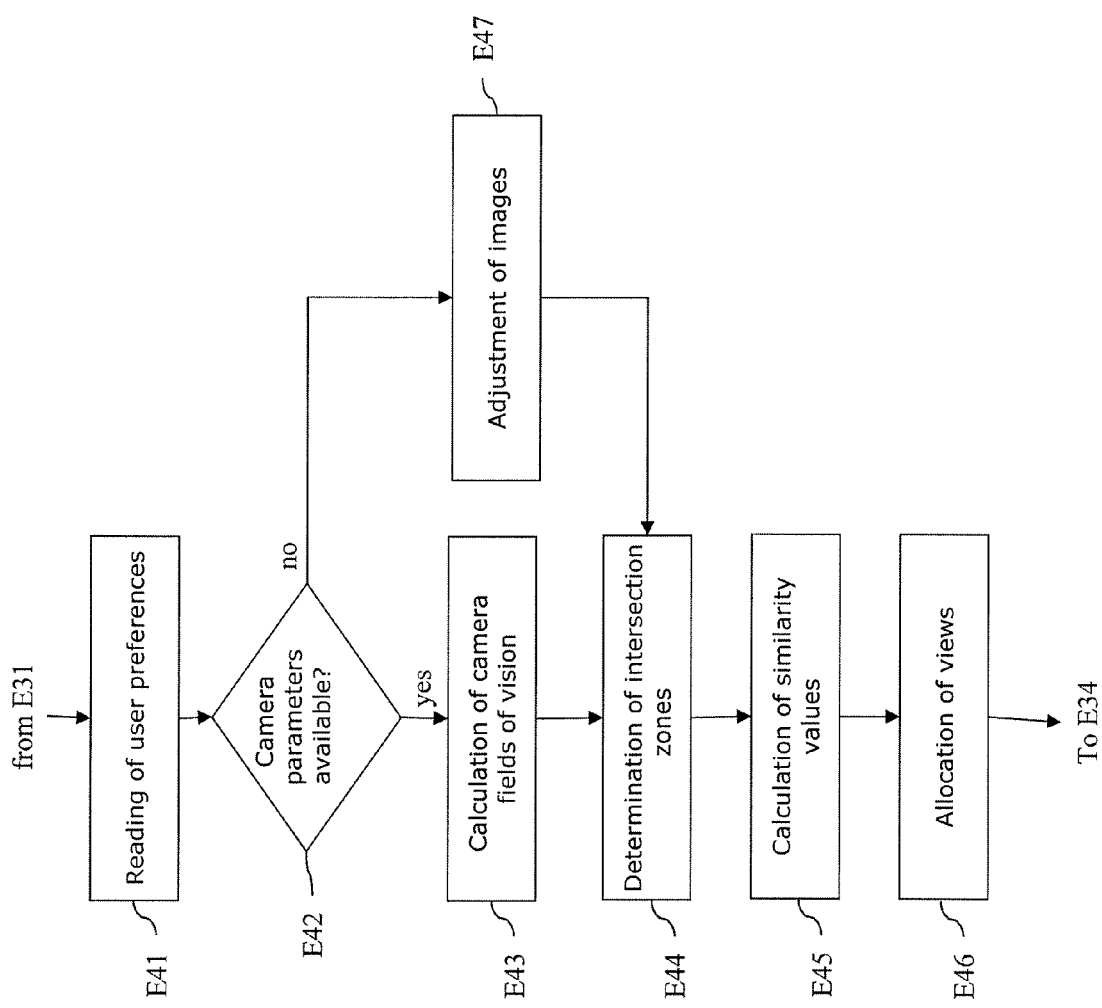
FIG. 4 depicts an algorithm for positioning the views in the predictive coding structure according to the invention.

With reference to FIG. 4, a description will now be given in detail of an algorithm for determining the associations of the initial views with the input views of the predictive coding structure according to the invention, which details in particular the analysis step E32 of FIG. 3.

According to the embodiment described here, the first step of the algorithm is step E41 of reading the user preferences, which makes it possible to define a coding mode favored by the user, among several modes envisaged.

The first mode consists of favoring a particular view, which will then be considered to be the principal view and associated with the view V1 at the input of the coding structure. In the preferred embodiment, this view is chosen by a user. According to an alternative embodiment, in the case of a plurality of client entities that must receive the coded multi-view stream, the principal view can be chosen, for example, as the view requested by the largest number of clients. The arrangement of the sequences issuing from the other cameras in the decoding structure will be carried out according to a rate-distortion optimization criterion with a view to optimization of the coding, as described below.

A second coding mode envisaged consists of seeking a global rate-distortion optimization of the coding of all the sequences, that is to say selecting both the sequence associated with the principal view and all the sequences associated with the secondary views according to a coding optimization criterion.

The following step E42 consists of testing the availability of the camera parameters. If these parameters are available, step E42 is followed by step E43.

Figure 5:
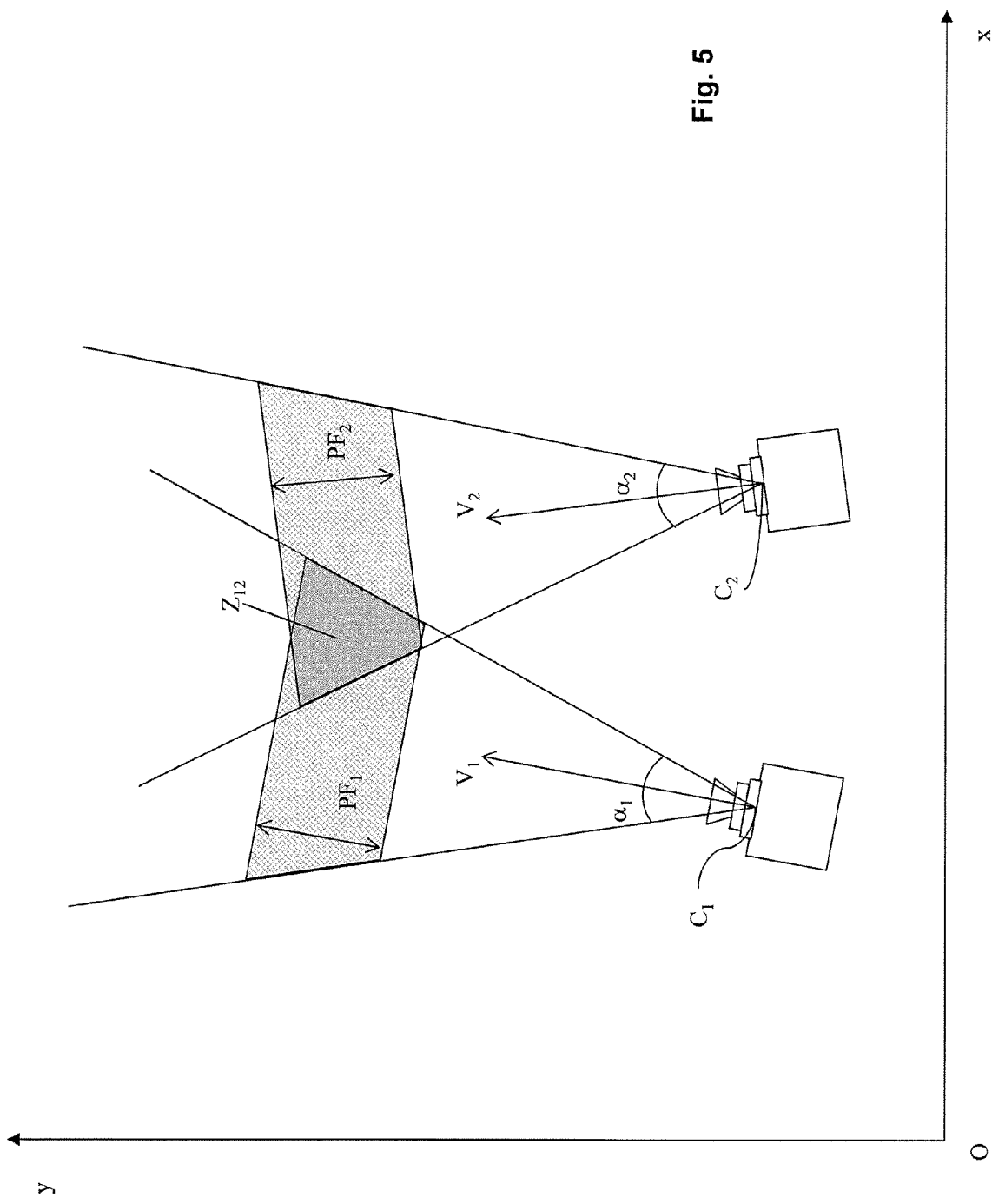
FIG. 5 depicts schematically the area of intersection of shots from two adjacent cameras.

During step E43 of determining the volumes photographed with each camera, the following parameters are taken into account in this embodiment.
 the position of the camera in three-dimensional space
 the axis of sight of the camera V
 the depth of field PF
 the angle of the lens $\alpha$ FIG. 5 shows a plan view of two cameras C1 and C2. The respective photographing volumes of these cameras are calculated according to the aforementioned parameters, and the depth of field is taken into account in order to define the sharpness zone. The projections in the plane (O, Ox, Oy) of their respective photographic volumes are parallelepipeds shown in gray tint in the figure.

It should be noted that, for two given cameras, it is possible to determine an overlap zone $Z_{12}$ which is the intersection zone between the two previously determined volumes, and which therefore corresponds to a part of the scene that is captured by the two cameras.

Step E43 is a step that can be carried out prior to the coding of the sequences captured by the cameras in question if the position of these cameras is fixed.

Returning to FIG. 4, in the case where the parameters of the cameras are not available, the test step E42 is followed by the adjustment step E47, which consists of adjusting the images of various views in order to determine whether they include common parts. In the preferred embodiment of the invention, this step is performed for all the pairs of sequences available. Image adjustment techniques known to persons skilled in the art can be used for this purpose. Conventionally, two fixed images taken by two distinct cameras are considered and an adjustment algorithm is applied making it possible to determine an intersection zone between these two images. It should be noted that this step can be carried out on fixed images and therefore for example on the first image of each sequence in question. Assuming that the position of the photographing cameras is fixed, this step does not have to be performed for the rest of the sequences, its result being valid since it is a case indirectly of determining an intersection zone between the photographing volumes of two cameras. In the case where the cameras move, it suffices to once again perform the adjustment step E47 in order to determine the intersection zone.

According to circumstances, step E43 or step E47 is followed by step E44, which consists of determining common parts between the views. Thus the calculation spaces are limited to these common parts determined.

As explained previously with reference to FIG. 5, for each pair of cameras in question, it is possible to determine an intersection zone containing a common part between the two views taken by the respective cameras. It is thus possible to determine an intersection zone by pairs of cameras for at least one sub-part of the cameras.

In the case where the determination step E44 follows the adjustment step E47, it consists, for each pair of views considered, of determining a spatial intersection zone between the views from the result of the adjustment.

In the preferred embodiment of the invention, all the pairs of views are considered. Thus the estimation of similarity between sequences of images or parts of sequences of images will be made solely from the image signal contained in the previously determined intersection zones. This has the effect of considerably reducing the calculation complexity of any resemblance determination method used subsequently.

Step E44 is followed by step E45 of calculating the similarity between the sequences. In the preferred embodiment, it is a case of the calculation of the intercorrelation between sequences of images, estimated solely on the previously determined intersection zones.

The intercorrelation between sequences is preferably calculated from one of a group of GOMV images in the sequence. According to the preferred embodiment, the surface area of the intersection zone is taken into account. Thus the final intercorrelation $IF_{i,j}$ between the sequence $S_i$ and the sequence $S_j$ is obtained by weighting the initial intercorrelation $II_{i,j}$ calculated on the signal contained within the intersection zone by the ratio between the common surface area SC between the views corresponding to the sequences and the total surface area of a view ST:

$$IF_{i,j} = II_{i,j} \times SC/ST \qquad (\text{eq 1})$$

In order to reduce further the number of calculations, it is possible to calculate the intercorrelation on a subset of images in the group of GOMV images in the sequence, possibly on a single image of the GOVM. Likewise, it is possible to take into account in the calculation only a subset of the pixels contained in an intersection zone.

FIG. 6a illustrates a numerical example of an intercorrelation matrix between sequences of images corresponding to five views. This matrix is symmetrical and comprises a diagonal composed of 1. Sorting the values of the correlation matrix makes it possible to associate the sequences with views at the input of the coding structure.

The table in FIG. 6b comprises the sum of the intercorrelation values for each sequence, obtained by adding the values of each line of the matrix in FIG. 6a.

According to alternative embodiments, it is possible to use other methods for estimating the resemblance between sequences. For example, it is possible to replace the calculation of the intercorrelation with a calculation of estimation of motion between the sequences, usually referred to as calculation of disparities in the context of MVC coding.

Returning to FIG. 4, step E45 is followed by step E46 of associating the sequences corresponding to the initial views of the scene with the views at the input of the MVC predictive coding structure, as a function of the mode chosen according to the user preferences at step E41.

According to the first mode envisaged, the initial view corresponding to the principal view is defined by external constraints, such as for example the choice of the user or of the majority of client entities, and consequently the associated sequence is chosen as the principal view. By way of example, let us assume that the view corresponding to the sequence S4 is selected as the principal view. It is then necessary to allocate the other sequences to the various input views of the predictive coding structure. To this end, it is possible to use the intercorrelation matrix between sequences of FIG. 6a. Thus the sequence most correlated with the sequence S4 is the sequence S3 (value 0.85), which is allocated to the view V3, which is thus directly predicted from the sequence S4 in the coding structure. In general terms, the sequence most similar to the sequence S4 is sought according to the previously calculated similarity values.

Next, the sequence most correlated with S3 is sought and it is the sequence S2 (value 0.82) that is attributed to the view V5. Finally, the sequence amongst the non-allocated sequences that maximizes the correlation with the sequence S4 (the principal view) is the sequence S5 (value 0.83), that will be attributed to the view V2. The remaining sequence will be attributed to the view V4. The result of this example is illustrated in FIG. 7a.

According to the second coding mode envisaged, the choice of the allocation of all the sequences to the various views is guided by the global optimization criterion for the coding of the sequence. In this case, the principal view is chosen as being the sequence that has the highest intercorrelation value with the other sequences of all the sequences to be coded. The table in FIG. 6b is used to determine this sequence. In the non-limiting example illustrated, it is the sequence S3 that maximizes the sum of the intercorrelations (total value equal to 3.89 according to the example in FIG. 6b), which is then chosen as the principal view. In general terms, the sequence for which the sum of the similarity values with all the other sequences is maximum is sought.

Next the sequence most correlated with S3, that is to say S4 (value 0.85), is associated with the view V3, and then the not yet attributed sequence most correlated with S4, that is to say S5 (value 0.83) is associated with V5. Finally, there is sought, among the non-attributed sequences, the one that has the maximum intercorrelation with the sequence S3 and it is the sequence S1 (value 0.65) that is attributed to the view V2. There remains finally the sequence S2, which is associated with the view V4. These results are illustrated in FIG. 7b.

Figure 8:
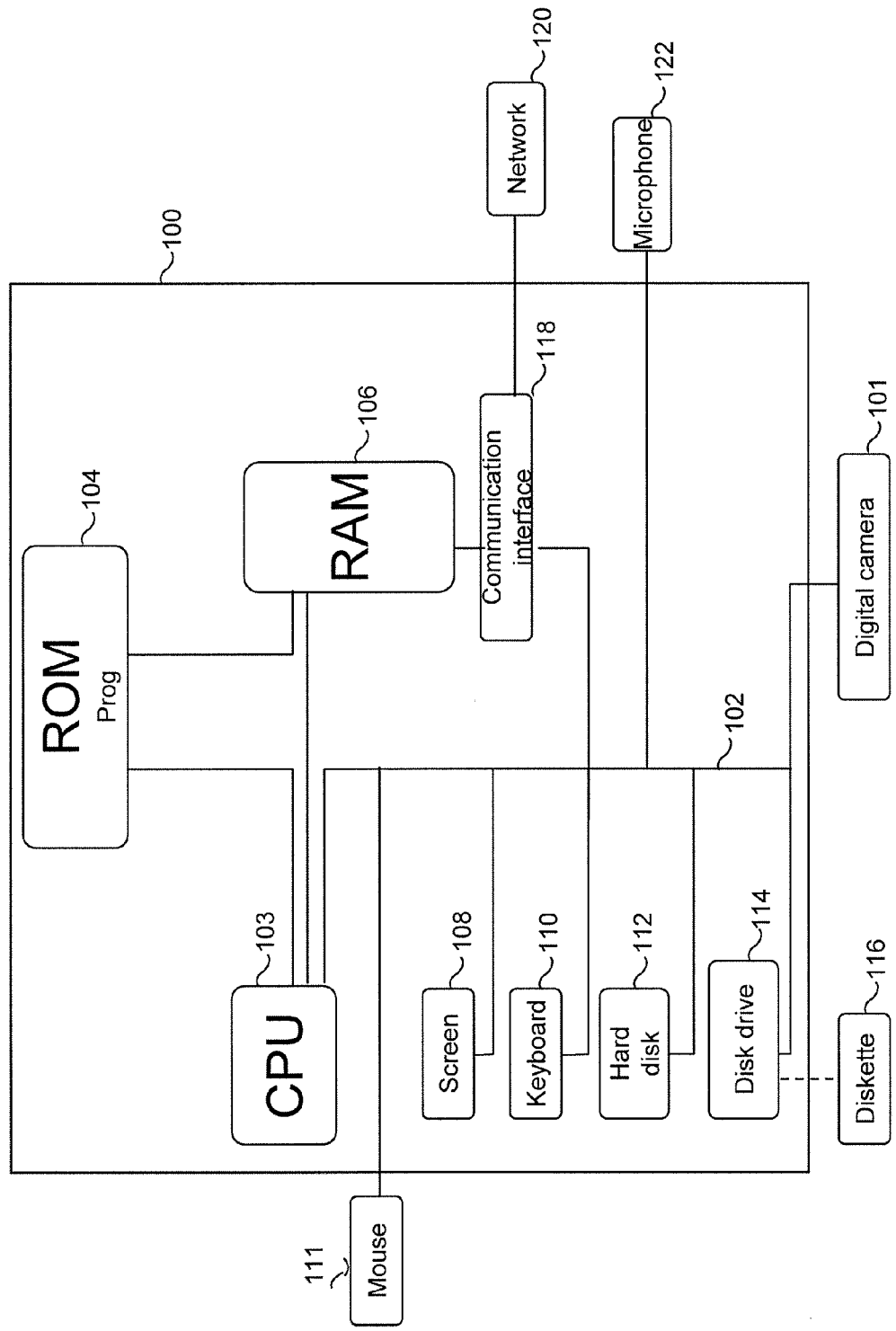
FIG. 8 depicts schematically a device adapted to implement the invention.

A device able to implement the method of the invention is illustrated in FIG. 8. The device 100 is for example a microcomputer, a workstation or a personal assistant.

The device 100 comprises a communication interface 118 connected to the communication network 120 able to transmit coded numerical data processed by the device. The device 100 also comprises a storage means 112 such as, for example, a hard disk. It also comprises a drive 114 for a disk 116. This disk 116 can be a diskette, a CD-ROM or a DVD-ROM for example. The disk 116, like the disk 112, can contain data to be processed according to the invention, for example a set of digital video sequences, as well as the program or programs implementing the invention which, once read by the device 100, will be stored on the hard disk 112. According to a variant, the program Prog enabling the device to implement the invention can be stored in read-only memory 104 (called ROM in the drawing). In a second variant, the program can be received so as to be stored in an identical fashion to that described previously by means of the communication network 120.

According to a variant, the device 100 can be connected to one or preferably several image acquisition devices such as the digital camera 101, which make it possible to acquire the data to be processed according to the invention.

This same device optionally possesses a screen 108 making it possible in particular to display the data processed or to serve as an interface with the user, who can thus parameterize the coding, for example in order to select the coding mode and if applicable the principal view chosen, by means of the keyboard 110 or any other pointing means, such as for example a mouse 111, an optical pen or a touch screen.

The central unit 103 (called CPU in the drawing) executes the instructions relating to the implementation of the invention, instructions stored in the read-only memory 104 or in the other storage elements. On powering up, the processing programs stored in a non-volatile memory, for example the ROM 104, are transferred into the random access memory RAM 106, which will then contain the executable code of the invention as well as registers for storing the variables necessary for implementing the invention.

In more general terms, an information storage means, able to be read by a computer or by a microprocessor, integrated or not into the device, possibly removable, stores a program implementing the method according to the invention.

The communication bus 102 affords communication between the various elements included in the device 100 or connected to it. The representation of the bus 102 is not limiting and in particular the central unit 103 is able to communicate instructions to any element of the device 100 directly or by means of another element of the device 100.

The invention claimed is:

1. A method of coding a plurality of digital image signals in a bitstream, the signals each corresponding to a view of a scene, wherein the coding method uses a pre-determined predictive coding structure that defines hierarchized coding dependencies between input views, and the views of the scene are associated with input views in the predictive coding structure, the method comprising the steps of:
   determining, for at least one pair of views of the scene, a spatial intersection zone between photographic volumes corresponding to each view which is more than a single point between the views of the at least one pair;
   calculating a value representing the similarity on the spatial intersection zone between the signals corresponding to the views of the at least one pair from at least some of the signals contained in the spatial intersection zone; and
   associating at least one of the views of the at least one pair with an input view of the predictive coding structure according to at least one calculated similarity value, so as to define hierarchized coding dependencies between the views of the at least one pair for encoding them.

2. A method according to claim 1, wherein the determination and calculation steps are performed for all pairs of views of the scene, to associate, according to the calculated similarity values, all of the views of the scene to the hierarchically-dependent input views of the predictive coding structure.

3. A method according to claim 2, wherein, in the step of associating the at least one view with an input view of the predictive coding structure, the association is performed according to all the values representing the similarity calculated.

4. A method according to claim 3, further comprising a step of obtaining a method of selecting a first input view, referred to as a principal view, of the predictive coding structure.

5. A method according to claim 4, wherein the method of selecting the principal view is selection by a user.

6. A method according to claim 4, wherein, when the bitstream is accessible to a plurality of client entities each able to choose a principal view, the method of selecting the principal view is a selection according to the majority choice of the client entities.

7. A method according to claim 4, wherein the method of selecting the principal view is a selection according to a coding optimization criterion.

8. A method according to claim 7, wherein the principal view selected is a view corresponding to the image signal for which the sum of the values of similarity with all the other image signals is a maximum.

9. A method according to claim 2, wherein all of the pairs of views of the scene comprises all of the pairs of views of the scene for more than two views of the scene corresponding to more than two digital image signals.

10. A method according to claim 1, wherein each image signal is obtained by a distinct imaging device, and in which at least one parameter of the imaging devices is, as used in the step of determining, the spatial intersection zone.

11. A method according to claim 1, wherein the step of determining the spatial intersection zone comprises a step of adjusting between at least two images of signals corresponding to the views of the at least one pair.

12. A method according to claim 1, wherein, in the association step, a view is associated with an input view of the predictive coding structure according to a value representing the similarity of the image signal corresponding to the input view with an image signal corresponding to a view previously associated with another input view of the predictive coding structure.

13. A method according to claim 1, wherein the value representing the similarity between signals is an intercorrelation between signals contained in the spatial intersection zone.

14. A non-transitory computer-readable storage medium retrievably storing a computer program for implementing a method of coding a plurality of digital image signals according to claim 1 when the program is executed by a computer system.

15. A method according to claim 1, wherein the spatial intersection zone is determined between photographic volumes corresponding respectively to each of the views of the at least one pair.

16. A method according to claim 1, wherein the predictive coding structure defines which input view is a reference view for encoding another input view, and the step of associating defines the reference view relative to the other view, based on the at least one calculated similarity value.

17. A method according to claim 1, wherein the predictive coding structure comprises a first input view, referred to as a principal input view, that is encoded by itself, and secondary input views the encoding of which depends on another input view.

18. A method according to claim 1, wherein the similarity value is calculated solely from the signals of the views contained in the spatial intersection zone.

19. A device for coding a plurality of digital image signals in a bitstream, the signals each corresponding to a view of a scene, wherein the coding device implements a coding method which uses a predetermined predictive coding structure that defines hierarchized coding dependencies between input views, and the views of the scene are associated with the input views in the predictive coding structure, the device comprising:
  means for determining, for at least one pair of views of the scene, a spatial intersection zone between photographic volumes corresponding to each view which is more than a single point between the views of the at least one pair;
  means for calculating a value representing the similarity on the spatial intersection zone between the signals corresponding to the views of the at least one pair from at least some of the signals contained in the spatial intersection zone; and
  means for associating at least one of the views of the at least one pair with an input view of the predictive coding structure according to at least one calculated similarity value, so as to define hierarchized coding dependencies between the views of the at least one pair for encoding them.

* * * * *